Jan. 3, 1928.

H. H. KISTNER 1,654,736

PISTON RING AND METHOD OF MAKING SAME

Filed Oct. 27, 1924   2 Sheets-Sheet 1

Inventor
Herman H. Kistner,
By Emery, Booth, Janney & Varney
his Attorneys

Jan. 3, 1928.  1,654,736
H. H. KISTNER
PISTON RING AND METHOD OF MAKING SAME
Filed Oct. 27, 1924  2 Sheets-Sheet 2
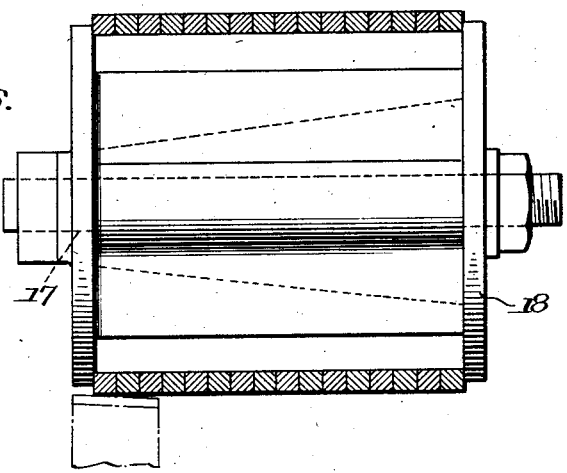
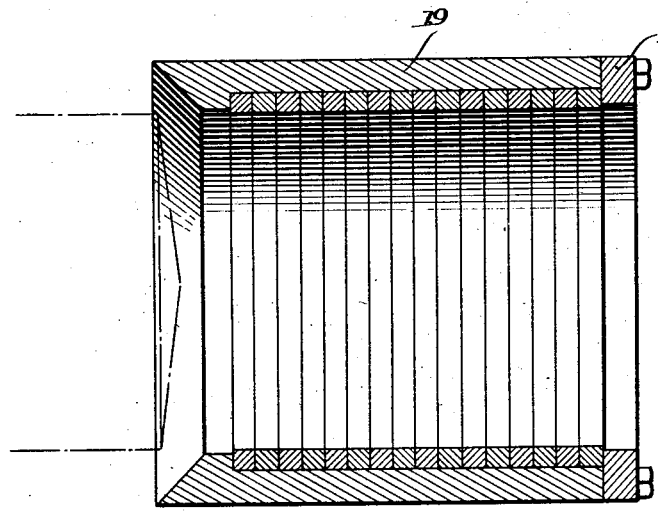
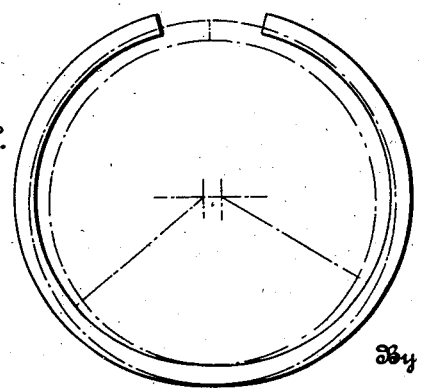
Inventor
Herman H. Kistner,
By Emery, Booth, Janney & Varney
his Attorneys Patented Jan. 3, 1928.

1,654,736

UNITED STATES PATENT OFFICE.

HERMAN H. KISTNER, OF ELIZABETH, NEW JERSEY.

PISTON RING AND METHOD OF MAKING SAME.

Application filed October 27, 1924. Serial No. 746,220.

This invention relates to improvements in piston rings and the methods of making them and aims generally to improve such rings and methods, and this application is a continuation in part of my application for piston rings, patterns therefor and methods of making them, Serial No. 628,708, filed March 30, 1923.

This invention aims, among other things, to simplify prior methods of making piston rings and to produce a ring which will assume true circular form when assembled in a cylinder and thereby will exert uniform radial tension against the walls of the cylinder under working conditions.

In the accompanying drawings, wherein I have shown the various stages of manufacture of a preferred form of piston ring and method of making the same, Fig. 1 is a plan view of a circular pattern suitable for the first stage of development of a non-circular pattern for casting rings according to this invention;

Fig. 6 is a sectional view showing the manner of finishing the outer face of the ring;

Fig. 7 is a sectional view showing the manner of finishing the inside face of the ring; and Fig. 8 is a plan view of the completed ring, showing the relationship between its shape and a true circle.

Figure 1:
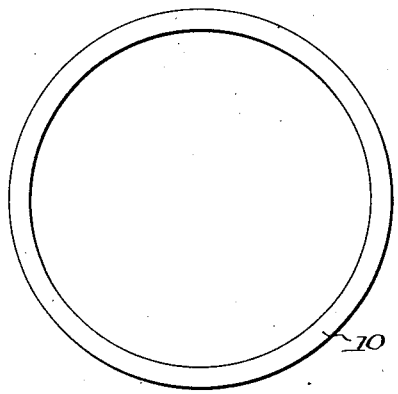

In carrying out my invention, I preferably produce a pattern 10 (Fig. 1) of true circular form and slightly larger than the internal bore of the cylinder in which the finished ring is to be used, so as to allow for shrinkage and for removing the outer surface to make the finish. The inner and outer peripheral edges of the pattern 10 are concentric, and the pattern may be of any suitable cross-sectioon, such as rectangular, to suit the shape desired for the finished ring.

If preferred, two or more rings may be produced from a single pattern by extending its axial length sufficiently.

The development of this pattern depends upon the tension of the ring required, and this may be controlled by the length of the gap in the finished ring, as is well understood in the art. In connection with this development I have discovered that if the circular ring pattern be elongated a certain amount, proportional to the length of the gap that is to be cut in the ring, when it is fitted within the cylinder in which it is to be used the ring will be of true circular form. In determining the amount of elongation of the pattern, I find that it is only necessary to consider the length of the gap in the finished ring, and this relationship is not affected by the diameter of the ring nor by the tension desired.

Figure 2:
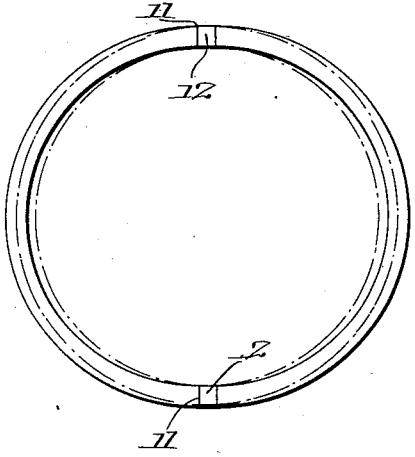
Fig. 2 is a plan view of the non-circular pattern, showing its relationship to the original circular pattern.
Figure 3:
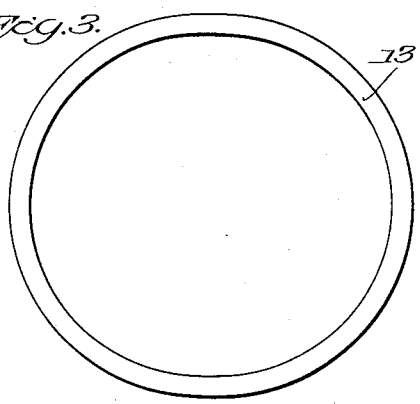
Fig. 3 is a plan view of a ring blank as made from the non-circular pattern, from which one or more rings may be produced.
Figure 5:
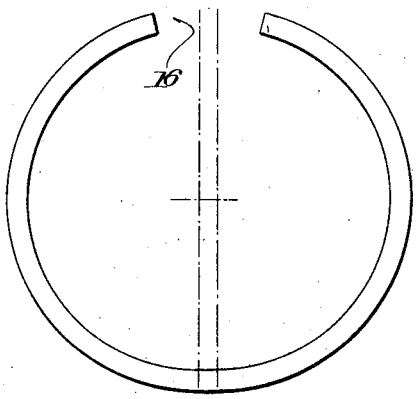
Fig. 5 is a plan view of a partly finished ring with a section thereof removed to form the gap, illustrating the relationship between the length of the insert pieces and the gap.
Figure 4:
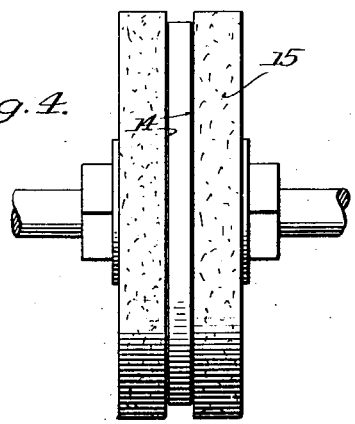
Fig. 4 is an elevational view illustrating the step of finishing the edges of the blank ring.

In order to produce a ring which is of true circular form when contracted within the bore of a cylinder and wherein the radial tension is uniform, I increase the circumference of the pattern by a length substantially one-third of the length of the gap to be cut in the finished ring, and I preferably cut the pattern 10 in two diametrically opposed places, as at 11, and insert therein at each cut a section 12 substantially one-sixth of the length of the cut out for the gap. The pattern thus formed (see Fig. 2) is of an elongated circular shape, formed of two true semicircular sections separated a definite distance and preferably connected by straight segments. A ring blank 13 (see Fig. 3) is then cast or otherwise reproduced from the finished pattern 10. The rings may be cut from the blank in any suitable manner, or if the blank is only long enough for a single ring, the opposed faces 14 are then ground to finished ring thickness (Fig. 4) by suitable means, such as the wheels 15 as shown in Fig. 4. The rings are then gapped by a milling or other suitable cutting machine, and a section 16 is cut out (see Fig. 5) to form the desired length of gap in the ring. The gap is preferably made in line with the minor axis of the ring and at a point corresponding with one of the inserted segments or "inserts" in the pattern. As will be clear from the relation of the insert to the gap referred to above, the amount of metal removed to form the gap is proportional to the sum of the lengths of the inserted segments and preferably substantially six times the length of the corresponding insert in the pattern if the two inserts are of equal length. In forming this gap the ends of the ring may be cut to provide any approved type of joint.

The elongated circular rings thus formed are then contracted so as to assume their natural contracted form and placed on a mandrel 17 (see Fig. 6). This mandrel comprises generally a shaft having suitable centering means thereon, the head plate and clamping plate being of a diameter slightly greater than the internal diameter of the compressed ring and less than the external diameter thereof, and the centering means preferably being expansible to accommodate different sizes of rings. The clamping is effected by end pressure between the removable clamping plate 18 and the head plate. The mandrel with assembled rings thereon is then placed in a suitable machine, such as a turning or grinding machine, where the outer surface of the casting is removed to finish the outer face to true circular form of the desired diameter.

The mandrel and assembled rings thereon are then inserted in a boring sleeve 19 having an internal diameter slightly greater than the outside diameter of the ring. The clamping plate 18 of the mandrel is then removed and the rings allowed to expand into engagement with the inner walls of the sleeve 19. The mandrel is then removed, and the rings are clamped in the sleeve 19 by means of a clamping ring 20. This step of transferring the rings from the mandrel 17 directly to boring sleeve 19 without permitting the rings to expand to their normal expanded condition has in addition to its practical advantages, that of preventing undue distortion in the finished ring and of retaining the uniform distribution of the strains and stresses set up in the metal when first contracted. The sleeve 19, with assembled rings therein, is then presented to a suitable finishing machine such as a boring or internal grinding machine, wherein the surface on the inner face of the ring casting is removed to true circular form and predetermined inside diameter, thereby producing concentric inner and outer walls.

The rings thus produced are of elongated circular form when in their normal condition simulating that of the pattern, but when contracted are of approximately true circular form. Also, the stresses and strains of the metal when the rings are contracted are so uniformly distributed that the rings exert substantially uniform radial pressure against the cylinder wall.

My invention is not to be restricted to forming the elongated circular ring blank by casting as the blank may be otherwise produced, as by a copying machine; nor do I wish to restrict my invention to the exact relation of the inserts to the gap as stated, as obviously slight variations thereof might produce a ring of approximately true circular form with sufficient accuracy for practical purposes. For instance, although I have found that a perfect ring may be produced when the length of each insert is one-sixth of the length of the gap, it is obvious that the perfect ring is approached as the relationship of the gap to the length of one of the inserts approaches six to one. In the claims, I do not intend the expressions "substantially" or "about" to mean "exactly" or "nearly exactly," but do intend them to cover such ratios in excess of unity as will approximate the results secured by my invention.

What I claim as my invention and desire to secure by Letters Patent is:

1. The method of making piston rings which consists of producing a ring blank elongated from a true circular form by insertions positioned at two opposite points aggregating a definite amount, removing a portion from one side of said ring embracing one of said insertions, said portion having a length about three times said amount of circumferential elongation of said blank, contracting the split ring, and then finishing the ring to true circular form.

2. The method of making piston rings which consists of producing a ring blank of elongated circular form, the foci of which are separated along the major axis a definite amount, removing a section from one side of said ring and of a length about six times the distance between the foci of said elongated ring, contracting said ring, and then finishing said ring to true circular form.

3. The method of making piston rings of various diameters which consists in producing a ring blank for each size of ring enlarged from true circular form by a definite amount and then removing a section from said ring blank to form the gap, the ratio of the length of the gap to the amount of circumferential elongation of the blank being the same for all diameters and about three to one, substantially as described.

4. A one piece piston ring or blank having its ends separated to form a gap of predetermined length, said ring or blank when in normal expanded position being of non-circular form circumferentially elongated from a true circular form by an amount about one-third of the length of the gap substantially as described.

5. A piston ring or blank having separated ends to form a gap, said ring or blank when in normal expanded position being of the form of two substantially true semicircular sections separated at their connected ends by a distance measured along a straight line about one-sixth of the distance between the ends of said ring at the gap.

6. That part of the method of making a piston or other ring which consists in producing from a ring blank elongated from true circular form a definite amount, by removing a section from one side thereof substantially three times greater than said amount of elongation, so as to form a gapped ring blank presenting truly circular segments between the opposite walls of the gap and points of the ring opposite the gap on opposite sides of and substantially less than one-half the length of said gap distant from a diametral line drawn through the center of said gap.

7. That part of the method of making piston or other ring blanks which consists in producing from a blank having its major axis elongated in a straight line a definite amount from true circular form, by removing a section from one side of said elongated blank in line with the minor axis thereof and approximately six times the amount of elongation of said major axis, the resulting gapped ring blank presenting truly circular segments between the opposite walls of the gap and points of the ring opposite the gap on opposite sides of and approximately one-twelfth the length of said gap distant from a diametral line drawn through the center of said gap.

8. As a new article of manufacture a piston or other ring of cast structure throughout having a wide gap in its circumference and presenting part-circular segments the foci of which are separated by a definite amount, the ratio between the length of the gap and the distance between the foci of the segments being approximately six to one, substantially as described, the inner and outer faces conforming to concentric circles in its contracted position.

9. The method of making a one piece concentric piston ring which in its working position is truly circular and exerts a predetermined approximately uniform radial wall pressure which comprises producing a ring blank of elongated circular form consisting of two true semi-circular sections separated by short segments each about one-sixth of the length of gap, and then removing from one side of the blank, in line with the minor axis thereof, a section equal to the predetermined length of gap, the relation between length of gap and segments being constant, irrespective of the diameter of the ring.

10. The method of making a gapped one piece concentric piston ring which in its working position is truly circular and exerts a predetermined uniform tension, which consists of producing a non-circular ring blank comprising segments of approximately semi-circular form the foci of which are separated a distance substantially one-sixth of and bearing a definite relation to the length of gap; and then removing from one side of the blank, in line with the minor axis thereof, a section equal to the predetermined length of gap; the ratio between the length of gap and distance between the foci of the segments being constant irrespective of the diameter of ring, substantially as described.

11. That part of the method of machining a plurality of split piston rings after they have been machined to true outside circular form in contracted position while clamped on a turning mandrel, which consists of assembling the rings in a sleeve while on the turning mandrel and then releasing the mandrel from the rings, and then transferring the sleeve and assembled rings therein to a boring fixture without permitting the rings to expand to their natural open form, thereby to permit machining of the ring on the outside and inside without disturbing the distribution of strains and stresses originally set up in the metal.

12. That part of the method of machining a plurality of split piston rings after they have been machined to true outside circular form in contracted position while clamped on a turning mandrel, which consists of assembling the rings in a holder closely fitting the outer faces of the rings while on the turning mandrel, next releasing the mandrel from the rings, and then transferring the holder and assembled rings therein to a boring fixture without permitting the rings to expand to their natural open form, thereby to permit machining of the ring on the outside and inside without disturbing the distribution of strains and stresses originally set up in the metal.

In testimony whereof, I have signed my name to this specification.

HERMAN H. KISTNER.